J. E. ROGERS.
MACHINE FOR JOINTING OVAL FRAMES.
No. 46,268.  Patented Feb. 7, 1865.
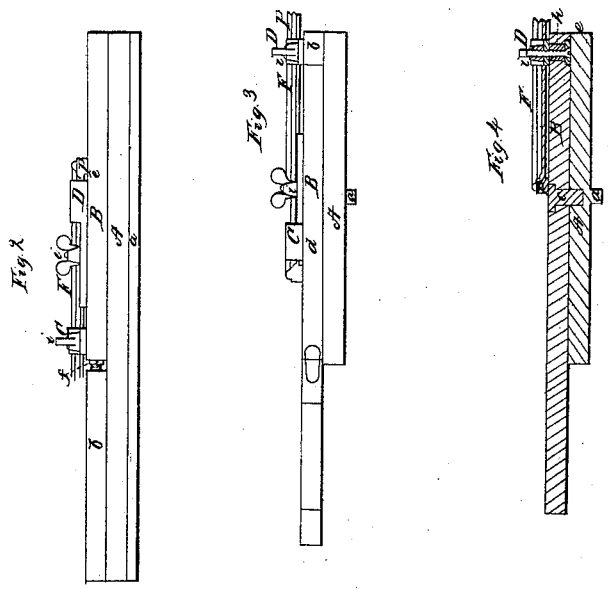
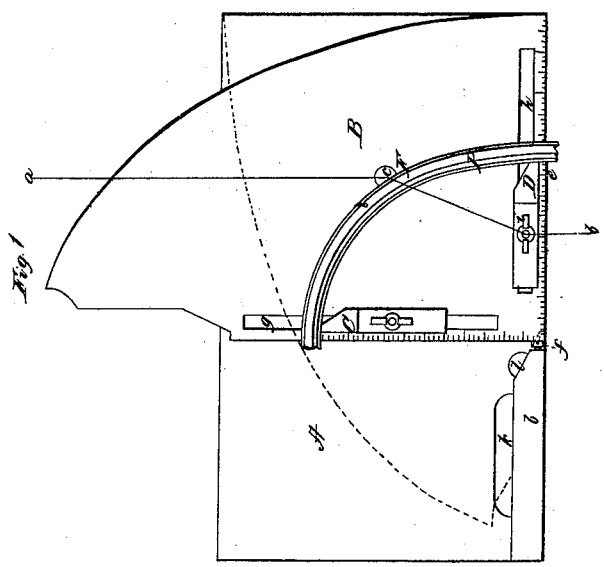

UNITED STATES PATENT OFFICE.

JAMES E. ROGERS, OF CHELSEA, MASSACHUSETTS.

MACHINE FOR JOINTING OVAL FRAMES.

Specification of Letters Patent No. 46,268, dated February 7, 1865.

*To all whom it may concern:*

Be it known that I, JAMES E. ROGERS, of Chelsea, in the county of Suffolk and State of Massachusetts, have invented a new and useful Improved Apparatus to be Used in the Process of Jointing the Parts of Oval Frames or Various other Articles of Carpentry; and I do hereby declare the same to be fully described in the following specification and represented in the accompanying drawings, of which—

Figure 1, is a top view, Fig. 2, a side elevation, Fig. 3, an end view, and Fig. 4, a transverse section of it.

This apparatus is intended to be used on a bench provided with a circular or other proper saw to run or play in a plane at right angles with the top surface of such bench; and such bench is to be provided with a long groove made in it and arranged parallel to the plane of the saw, such groove being to receive a guide tongue, $a$, projecting down from the lower surface of a platform or board, A, of the jointing apparatus. By means of such tongue and groove, the apparatus when moved along the bench will be guided parallel to the saw. The platform, A, is a rectangular board or carriage, furnished with a rib or projection, $b$, extending upward from and arranged on it, as shown in Figs. 1, 2, and 3. On the upper end of the board A, another or auxiliary board or platform, B, is placed, it having two of its edges, $d$, $e$, making a right angle with each other and equidistant from a pin, $c$, extending through the board, B, and into the board, A. The said pin serves as a center for the board B, while being turned or revolved on the board, A, and through an arc of ninety degrees, the said board, B, being estopped at one terminus of its movements by the projection, $b$, and at the other by an adjusting screw, $f$, inserted in the end of the said projection, $b$. The position of the board, B, when the latter is against the part, $b$, is represented in Fig. 1, in part by dotted lines. Furthermore, there is applied to the board, B, two adjustable rests, C, D, they being arranged within long slots $g$, $h$, made in and through the said board. Each of the rests has a clamping screw and nut, as shown at, $i$, for fixing it in position along any part of its groove. There may be a scale of divisions adjacent to each of the two rests C, D, and for facilitating the proper adjustment of it, such scales being shown in Fig. 1.

Close to the inner or bearing edge of the projection, $b$, there may be a passage, $k$, made down through the board, A. Another passage, $l$, may be made through the said board and aside of the adjusting screw, $f$. These passages are to enable to escape through the boards, A, any saw dust or chips, which accumulating on the said board would be likely to prevent the board B, from being turned into close contact with the projection, $b$, or the head of the screw, $f$.

In using the apparatus, the piece of stuff (forming a little more than one fourth of an oval frame for instance) is to be laid on the board, B, and held against the rests, C, D, in manner as shown at F. Under this condition of things, the apparatus should be moved forward on the bench so as to cause the saw to cut through the piece, P, at or near one end of it, after which, the apparatus should be moved back to place, and the board B, should be turned around ninety degrees on the board, A. Next, the apparatus, should be again advanced so as to cause the saw to pass through the stuff at or near its opposite end. When four pieces of stuff have been so cut, each will have the same length, and when placed together so as to constitute an oval frame, their ends abutting together will meet in perfect joints.

I claim as my invention—

The jointing apparatus or machine, composed of the two platforms, (A, B,) the stops, ($b$, $f$,) and adjustable rests (C, D,) arranged and constructed substantially in manner and so as to operate as and for the purpose specified.

JAMES E. ROGERS.

Witnesses:
R. H. EDDY,
F. P. HALE, Jr.